United States Patent [19]

Loizeau

[11] Patent Number: 4,570,774

[45] Date of Patent: Feb. 18, 1986

[54] TORSION DAMPING DEVICE, ESPECIALLY A CLUTCH PLATE FOR A MOTOR VEHICLE

[75] Inventor: Pierre Loizeau, Ville D'Avray, France

[73] Assignee: Valeo, Paris, France

[21] Appl. No.: 522,358

[22] Filed: Aug. 11, 1983

[30] Foreign Application Priority Data

Aug. 13, 1982 [FR] France .................. 82 14122

[51] Int. Cl.[4] .............................................. F16D 3/14
[52] U.S. Cl. .................................. 192/106.2; 464/66; 464/68
[58] Field of Search ............... 192/106.2, 106.1, 70.17, 192/55; 464/66, 68, 81

[56] References Cited

U.S. PATENT DOCUMENTS

| | | | |
|---|---|---|---|
| 2,745,268 | 5/1956 | Reed | 192/106.2 |
| 3,762,521 | 10/1973 | Dotter | 192/106.2 |
| 4,024,938 | 5/1977 | Maucher | 192/106.2 |
| 4,398,625 | 8/1983 | Beccaris | 192/106.2 |
| 4,412,606 | 11/1983 | Loizeau | 192/106.2 |
| 4,433,770 | 2/1984 | Loizeau et al. | 192/106.2 |
| 4,453,838 | 6/1984 | Loizeau | 192/106.2 |
| 4,496,036 | 1/1985 | Loizeau | 192/106.2 |

FOREIGN PATENT DOCUMENTS

| | | |
|---|---|---|
| 1537961 | 8/1968 | France . |
| 2061162 | 6/1971 | France . |
| 2106316 | 4/1972 | France . |
| 2223595 | 10/1974 | France . |
| 2496786 | 6/1982 | France . |

Primary Examiner—James C. Yeung
Attorney, Agent, or Firm—Charles A. Brown; Charles E. Brown

[57] ABSTRACT

The friction means acting between the two rotary parts constituting a torsion-damping device comprises at least one annular component which is engaged by means of an axial bearing surface with an axial bearing surface of one of the rotary parts and which, by engagement means, is capable of being connected in rotation to the one rotary part over at least one range of the angular movement between the rotary parts. According to the invention, the annular component is opened circularly by means of at least one slit, and elastic means are associated with it which permanently stress it radially in the direction of the axial bearing surface of the one rotary part.

14 Claims, 14 Drawing Figures

TORSION DAMPING DEVICE, ESPECIALLY A CLUTCH PLATE FOR A MOTOR VEHICLE

BACKGROUND OF THE INVENTION

The present invention relates, in general terms, to torsion-damping devices of the type comprising at least two coaxial parts mounted rotatably relative to one another within the limits of a specific angular movement and elastic means interposed circumferentially between the said parts.

As is known, such a torsion-damping device is conventionally used to form a clutch plate assembly, especially for a motor vehicle, one of its rotary parts then comprising a friction disc intended to be fixed in rotation to a first shaft, in practice a drive shaft, the output shaft of the engine, for example, a motor vehicle, while another of the the rotary parts is carried by a hub intended to be fixed in rotation to a second shaft, in practice a driven shaft, for example the input shaft of a gear box in the particular case of such a motor vehicle.

Such a torsion-damping device makes it possible to ensure controlled transmission of the torque applied to one of its rotary parts when the other is itself subjected to a torque, that is to say to absorb the vibrations liable to occur over the entire length of the kinematic chain which then extends from the engine to the controlled shafts of the wheel on which it is inserted.

In practice, the elastic means interposed circumferentially between the two rotary parts in question, conventionally called elastic means with circumferential action, are distributed in several "stages" of different rigidities, which intervene as a function of the angular movement between the rotary parts. At the start of this angular movement, only a stage of relatively low rigidity is involved, and, in proportion to the development of the angular movement, one or more other stages of relatively higher rigidity act in turn, then adding their effects to those of the first.

Thus, the value of the total rigidity of the active elastic means with circumferential action can be matched appropriately to the value of the torque to be transmitted.

Likewise in practice, friction means also act between the rotary parts in question to achieve the desired damping.

As is known, this results in a hysteresis effect that is to say a differentiation, for a given value of angular movement between the rotary parts in question, between the value of the torque transmitted between these rotary parts during an increasing change in the torque and the value of this torque during a decreasing change.

Of course, the friction torque attributed to the friction means used must be matched to the value of the rigidity of the corresponding elastic means with circumferential action. When this is low, it must preferably be relatively low itself.

The friction means used in this way between the two rotary parts in question usually comprises at least one friction washer, and this takes effect by means of one of its transverse faces, such a friction washer being in contact by means of this face with any transverse component belonging to one of the rotary parts, while being fixed in rotation to the other of these rotary parts over at least one range of the angular movement between them.

As regards a torsion-damping device in which one of the rotary parts comprises a hub and the other at least one guide washer, arranged around the hub, it has already been proposed, particularly in French Pat. No. 1,537,961, to achieve the desired friction by making use of a bearing located radially between this hub and this guide washer to prevent the latter from inadvertently shearing the hub.

Such a bearing, which is an annular component, then engages by means of an axial bearing surface with an axial bearing surface of the hub on which it is engaged, while being connected in rotation by engagement means to the associated guide washer.

Now as is known, as regards a clutch plate assembly, one of the rotary parts in question is centered on the drive shaft, while the other is centered on the driven shaft.

A misalignment can consequently arise between them, these shafts themselves not necessarily being precisely aligned with one another, particularly since it is becoming increasingly common, at the present time, for the friction disc of a clutch plate assembly for a motor vehicle to be arranged in an overhanging position on the input shaft of the gear box which constitutes the associated driven shaft.

Such a possible misalignment between the two rotary parts in question can result in the friction generated by the bearing, which is used radially between them and which conventionally acts from the start of their angular movement, being too high with regard to the single first stage of relatively low rigidity of the elastic means with circumferential action, which then acts, this being at the risk of nullifying its effects prematurely.

The subject of the present invention is, in general terms, an arrangement making it possible to mitigate this disadvantage and also opening up a new field of use for the relevant friction means.

SUMMARY OF THE INVENTION

According to the present invention there is provided a torsion-damping device, especially a clutch plate assembly, of the type comprising at least two coaxial parts mounted rotatably relative to one another within the limits of a specific angular movement, elastic means interposed circumferentially between the parts, and friction means acting between these. The friction means comprises at least one annular component which engages by means of an axial bearing surface with an axial bearing surface of one of the rotary parts and which, by engagement means, is capable of being connected in rotation, in at least one circumferential direction and over at least one range of the angular movement, to the other of the rotary parts. This torsion-damping device is characterised, in general terms, in that the annular component is opened circularly by means of at least one slit, and in that means are associated with it which permanently stress it radially in the direction of the axial bearing surface of the rotary part in question.

According to one characteristic of the invention, the means are elastic.

According to a particular embodiment, this annular component itself constitutes the elastic means associated with it, and for this purpose it is elastically deformable in a radial direction and has a configuration at rest with a diameter different from that of the axial bearing surface of the rotary part in question, with which it is engaged.

In an alternative form, the elastic means associated with this annular component comprises at least one elastic member separate from the latter. Such an elastic member may act locally, being engaged with the ends of the annular component which delimit the slit in the latter, or may be itself formed by a coaxial annular component of the assembly, thus constituting, according to a particular embodiment, a radial compressing means.

Because of the slit which the annular component possesses, the friction torque which is attributed to the latter and which acts between surfaces urged elastically towards one another in a radial direction, the annular component (referred to below for the sake of convenience as an annular component with radial friction) can, under the control of the corresponding elastic means, advantageously be adjusted to the desired value and, for example, be in proportion to the elastic means with circumferential action of relatively low rigidity which act at the start of the angular movement between the two rotary parts in question. It will also be noted that it can compensate for the production tolerances and the wear.

Consequently, if, for example, the annular component with radial friction is, as is conventional, a bearing which intervenes radially between two elements constituting the two rotary parts in question, the friction torque attributed to it can advantageously be sufficiently low, in a controlled way, so as not to disturb the functioning of the assembly at low values of angular movement between the rotary parts in question.

If desired, the annular component with radial friction can consist of a component other than such a bearing, for example a friction washer; the friction washer then taking effect by means of its edge.

In one embodiment the engagement means associated with the annular component with radial friction is located in a single zone of the latter which is diametrically opposite its slit.

In such a case, because of the symmetry which is thus preserved for this annular component with radial friction, the friction torque attributed to the latter is the same whether the angular movement between rotary parts in question takes place circumferentially in one direction or circumferentially in the opposite direction.

In other words, this torque is the same whether the assembly operates under traction or whether it operates on the overrun.

In this case, the annular component with radial friction is divided symmetrically, starting from the engagement means associated with it, into two identical segments with a circumferential extent, one of which segments, extending circumferentially downstream of the engagement means, is subjected to a thrust and therefore tends to close up on itself and consequently increase its effects, and the other of which, extending circumferentially upstream, is subject to traction and therefore tends to open and consequently reduce its effects.

However, because of the symmetry of the assembly, such an adjustment between the effects of the two segments thus delimited on the annular component with radial friction takes place identically, but in reverse when the assembly operates under traction and when it operates on the overrun, so that there is no differentiation in the resulting friction torque.

The same is true if the engagement means associated with the annular component with radial friction are located in several zones of the latter which are uniformly distributed circularly round the axis of the assembly.

In effect, because of the symmetry preserved in this way, no differentiated resultant devlops between the successive segments of the annular component with radial friction.

The same is not true, however, if, according to a development of the invention, the engagement means associated with this annular component with radial friction is located in a single zone of the latter which, whether located at one point or extended circularly to a greater or lesser extent, is arranged circularly apart from the zone diametrically opposite its slit.

In this case, the downstream and upstream segments of this annular component with radial friction on either side of the engagement means associated with it are of different circumferential extent.

The friction torque attributed, for example, to the upstream segment for a given direction of change in the angular movement between the rotary parts in question is thereafter no longer the same depending on whether this segment is the one which is the most extended circumferentially or the one which is the least extended circumferentially.

The same is true of the friction torque attributed to the downstream segment for the relevant direction of change in the angular movement.

The consequence of this is that the resulting friction torque is no longer the same for both of the directions of change in the angular movement, or in other words, it is no longer the same when the assembly operates under traction and when it operates on the overrun.

It is therefore possible, if desired, to differentiate for both circumferential directions the friction torque attributed to the annular component with radial friction which is used.

DESCRIPTION OF THE PREFERRED EMBODIMENTS

Figure 1:
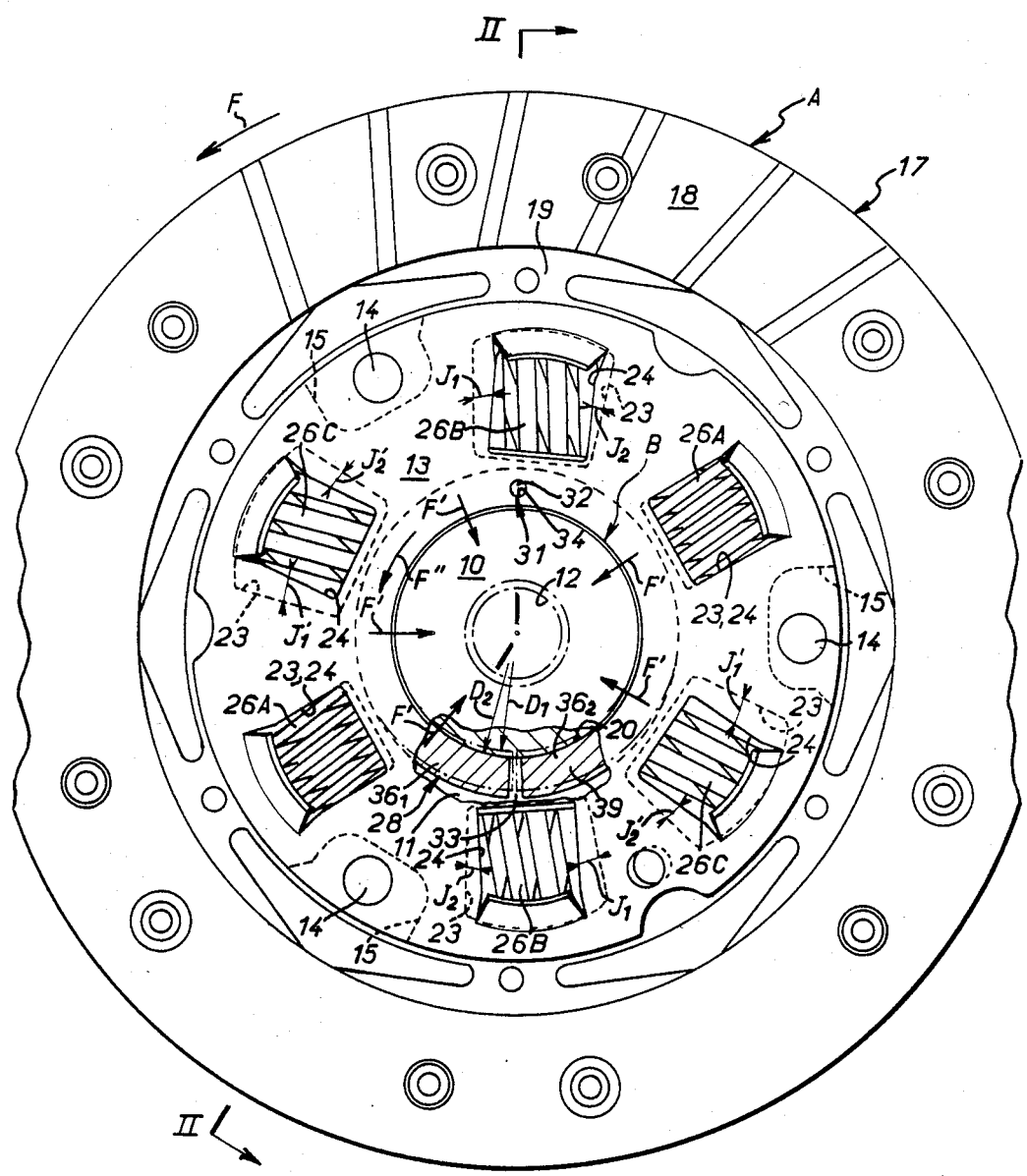
FIG. 1 is, with a local cutaway portion, a partial elevation view of a torsion-damping device according to the invention, in the direction of the arrow I in FIG. 2.

In these Figures, the torsion-damping device to which the invention applies constitutes, by way of example, a clutch plate assembly with a damping hub.

In the embodiments illustrated, this clutch plate assembly comprises two coaxial parts, namely a driving part A and driven part B, which are mounted rotably relative to one another within the limits of a specific angular movement and against the action of elastic means designed to act circumferentially between them. These are called elastic means with circumferential action.

The driven part B comprises a hub 10 and a hub disc 11 which extends transversely round the hub 10, and is fixed thereto.

The hub 10 is designed to be engaged on a shaft, in practice a driven shaft, for example the input shaft of the gear box in the particular case of a clutch plate assembly for a motor vehicle.

In the embodiments illustrated, to fix it in rotation to such a shaft, the hub 10 has splines 12 on its inner periphery.

The driving part A comprises two guide washers 13 which extend transversely round the hub 10 on either side of the hub disc 11 at a distance from the latter and which are fixed to one another by axial spacers 14 which pass with play through notches 15 made for this purpose on the periphery of the hub disc 11.

In the embodiments illustrated, there are three of these axial spacers 14 and they are cylinders of circular cross-section.

The driving part A also comprises a friction disc 17 which by means of a disc 19, which may be fragmented into separate blades, is fixed to the guide washers 13 by means of the axial spacers 14 already fixing these to one another. The friction disc 17 has friction linings 18 on either side of the periphery of its disc 19.

By means of the friction linings 18, such a friction disc 17 is intended to be clamped between two plates fixed in rotation to a second shaft, in practice a drive shaft, the output shaft of the engine in the particular case of a clutch plate assembly for a motor vehicle.

In the embodiments illustrated, the friction disc 17 is coupled by means of its disc 19 to one of the guide washers 13, and, located between the periphery of the assembly thus formed and the hub 10 is an annular component 20 forming a bearing, to which is fixed a radial collar 21 inserted axially between the assembly and the hub disc 11.

In the embodiments illustrated, the elastic means with circumferential action interposed between the rotary parts A and B thus formed consist of springs 26A, 26B and 26C of the coil-spring type.

These springs 26A, 26B and 26C, which all extend substantially tangentially to a circumference of the assembly, are each individually arranged partly in receptacles provided for this purpose in the rotary part B, namely apertures 23 in the hub disc 11, and partly in receptacles likewise provided for this purpose in the rotary part A, namely apertures 24 in the guide washers 13.

In practice, as regards the configuration of the assembly at rest, as shown in FIG. 1, the springs 26A are arranged without play both in the corresponding apertures 23 of the hub disc 11 and in the apertures 23 of the hub disc 11 and in the apertures 24 of the guide washers 13, these having for this purpose the same circumferential extent whereas, with regard to the springs 26B and 26, since the circumferential extent of the apertures 23 in the hub disc 11 is then greater than that of the apertures 24 in the guide washers 13, there is at each end of these springs 26b, and 26C, for this configuration at rest, a circumferential play between such end and the corresponding radial edge of the aperture 23 of the hub disc 11, in which such a spring 26B, 26C is accommodated.

For the direction of rotation identified by the arrow F in FIG. 1, which corresponds to the direction of rotation associated with forward travel of the vehicle in question and to an increasing direction in the angular movement between the rotary parts A and B and thus to operation of the assembly under traction, this play, measured angularly, has a value J1 for the springs 26B and a value J'1, greater than the preceding value, for the springs 26C.

For the direction of rotation opposite that of the arrow F, which corresponds to a decreasing direction in the angular movement between the rotary parts A and B and therefore corresponds to operation of the assembly on the overrun, this play, measured angularly, has for the springs 26B a value J2 less than that of the play J1 and for the springs 26C a value J'2 less than that of the play J'1.

In practice, in the embodiments illustrated, there are two springs 26A, and they are substantially diametrically opposite one another.

The same is true of the springs 26B and 26C which alternate with the preceding ones.

These arrangements, which are given here only by way of example, are well-known per se, and since they do not form part of the present invention they will not be described in any more detail.

Friction means are also provided between the rotary parts A and B.

In a way known per se, these friction means comprise, in addition to the bearing 20 and the radial collar 21, an annular component 28, referred to below for the sake of convenience as an annular component with radial friction, which is engaged by means of an axial bearing surface 29 with an axial bearing surface 30 of one of the rotary parts A and B and which, by engagement means 31, is capable of being connected in rotation, in at least one circumferential direction and over at least one range of the angular movement between the rotary parts A and B, to the other of these rotary parts.

This annular component with radial friction 28 is opened circularly by means of a slit 33, and means are associated with it which permanently stress it radially in the direction of the axial bearing surface 30 of the rotary part A, B in question. In the example described, these means are elastic.

Figure 2:
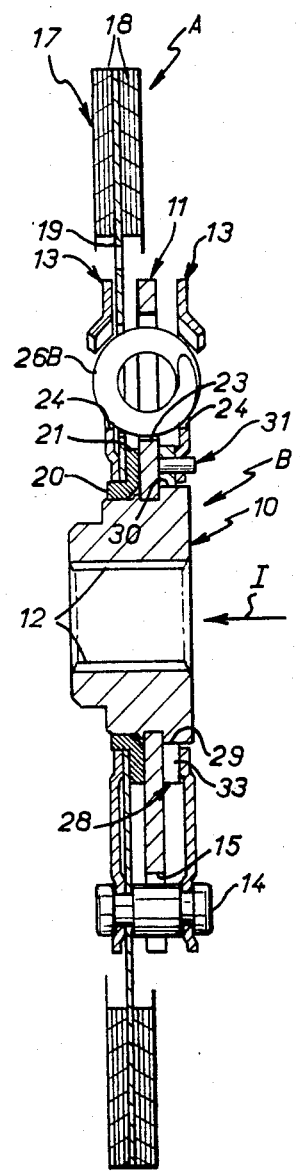
FIG. 2 is a view of this in an axial section along the broken line II—II in FIG. 1.

In the embodiment illustrated more particularly in FIGS. 1 and 2, this annular component with radial friction 28 consists of a simple friction washer which, being inserted axially between the hub disc 11 and the guide washer 13 opposite that with which the friction disc 17 is associated, acts by means of its edge.

In other words, it is the edge of this friction washer, in practice the edge of its inner periphery which constitutes the axial bearing surface 29 by means of which the annular component with radial friction 28 is engaged with one of the rotary parts A, B in question.

In the embodiment illustrated in FIGS. 1 and 2, the latter is the rotary part B, the corresponding axial bearing surface 30 belonging to the hub 10.

In conjunction with this, the annular component with radial friction 28 is then connected in rotation to the rotary part A by the engagement means 31.

As illustrated, these engagement means 31 consist of a fitting member, in this case a pin 32 which, projecting axially from the annular component with radial friction 28, is designed to interact with a complementary fitting means fixed to the rotary part A, in this case a passage 34 provided for this purpose in the adjacent guide washer 13.

In the embodiment illustrated in FIGS. 1 and 2, this pin 32 is engaged without play in such a passage 34.

As will be noted, the engagement means 31 formed in this way act substantially in a single zone of the annular component with radial friction 28.

In the embodiment illustrated in FIGS. 1 and 2, the latter is diametrically opposite the slit 33 in the annular component with radial friction 28.

Consequently, in this embodiment, the engagement means 31 associated with the annular component with radial friction 28 divides the latter into two circumferential segments $36_1$ and $36_2$ having the same circumferential extent, one extending circumferentially in the direction identified by the arrow F in FIG. 1 and the other extending circumferentially in the opposite direction.

Finally, in the embodiment illustrated in FIGS. 1 and 2, the annular component with radial friction 28 itself constitutes the elastic means associated therewith; the annular component with radial friction 28 being elastically deformable in a radial direction and having a configuration at rest, of which the diameter D1, as indicated by broken lines in FIG. 1, is less than the diameter D2 of the relevant axial bearing surface 30 of the hub 10.

The result of this is that, at each of the points on the edge of its inner periphery, this annular component with radial friction 28 is elastically stressed radially in the direction of the axial bearing surface 30 of the hub 10, as indicated in places by arrows F' in FIG. 1.

During operation, when, for the assembly functioning under traction, the direction of rotation of said assembly being that identified by the arrow F in FIG. 1, an increasing torque is applied to the rotary part A, initially this torque is first transmitted to the rotary part B by the springs 26A only.

Then, secondly, the play J1 being absorbed, the springs 26B intervene in turn, adding their effects to those of the springs 26A which remain compressed.

Thirdly, the play J2 being absorbed, the springs 26B likewise intervene, adding their effects to those of the springs 26A and 26B which remain compressed.

At the final stage of the corresponding angular movement between the rotary parts A and B, there is direct positive drive of the driven part B by the driving part A either because, being fully compressed, at least any one of the springs 26A, 26B and 26C then has contiguous turns or because the axial spacers 14 are then in contact with the corresponding radial edge of the notches 15 of the hub disc 11 through which they pass.

For a decreasing torque between the rotary parts A and B, corresponding to the assembly operating on the overrun, a process opposite to that briefly described above takes place.

In both cases, the annular component with radial friction 28 acts over the entire length of the relative angular movement between the rotary parts A and B and, since it is connected in rotation to a guide washer 13, develops a friction torque in contact with the axial bearing surface 30 of the hub 10 which it grips.

When the assembly operates under traction, the circumferential segment $36_1$ or $36_2$ which is downstream of the associated engagement means 31 closes up on the axis of the assembly, because, as indicated by the arrow F'' in FIG. 1, it is subjected circumferentially to thrust, so that, with regard to the overall friction torque developed, the effects attributable to it are greater than those of the corresponding upstream segment, the latter then on the contrary being subjected to a pull and therefore tending to open.

When the assembly operates on the overrun, the process is the same and, since the segments $36_1$, $36_2$ delimited circumferentially on the annular component with radial friction 28 by the engagement means 31 associated with it. Both have the same circumferential extent, and the friction torque remains substantially the same as before, even though, from one mode of operation to another. The downstream/upstream situation is reversed, but in a symmetrical way, from one of the said circumferential segments $36_1$, $36_2$ to the other.

Figure 3:
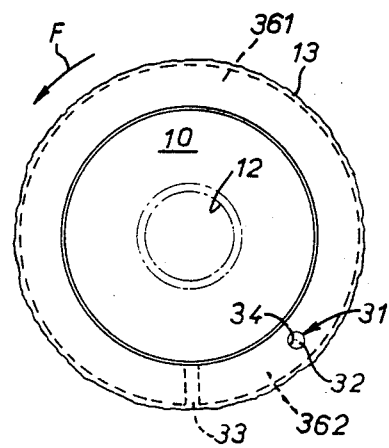
FIGS. 3, 4 and 5 each repeat part of FIG. 1 and relate respectively to different alternative embodiments.

The same does not apply when, as illustrated in FIG. 3, the engagement means 31 is located in a zone of the annular component with radial friction 28 which is arranged circularly apart from the zone of the latter diametrically opposite its slit 33.

In this case, for operation under traction, as illustrated, the circumferential segment $36_1$ or $36_2$ of the annular component with radial friction 28 which is then subjected to a thrust has an extent which is greater than that of the segment which is subjected in conjunction to a pull.

Because of the asymmetry produced in this way, the friction torque attributed to the annular component with radial friction 28 is different depending on whether the assembly operates under traction or operates on the overrun.

In the embodiment illustrated, it is greater when the assembly operates under traction than it is when the assembly operates on the overrun, but in an alternative form an opposite arrangement can be provided, if desired.

In the foregoing, the complementary fitting members constituted by the pin 32 and the passage 34 forming the engagement means 31 are engaged with one another without play.

Consequently, the annular component with radial friction 28 acts from the start of the angular movement between the rotary parts A and B.

Its intervention therefore accompanies that of the springs 26A which are then the only ones in operation.

The same can be true of the friction possibly attributed to the bearing 20 and to the radial collar 21 of the latter.

The arrangement is such that the friction thus generated during the intervention of the springs 26A, which are generally of relatively low rigidity, is not sufficiently great to nullify the action of the latter.

If need be, the rigidity of the elastic means associated with the annular component with radial friction 28, whether these elastic means are formed by the latter or whether they are formed by a separate elastic member, is adjustable.

Figure 4:
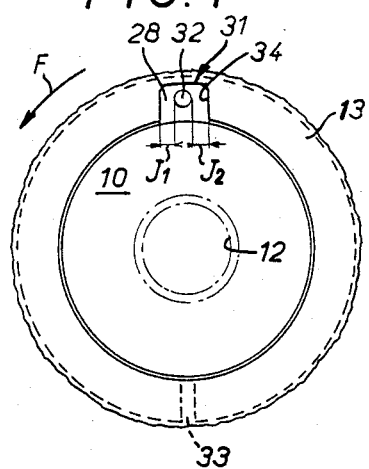
Figure 5:
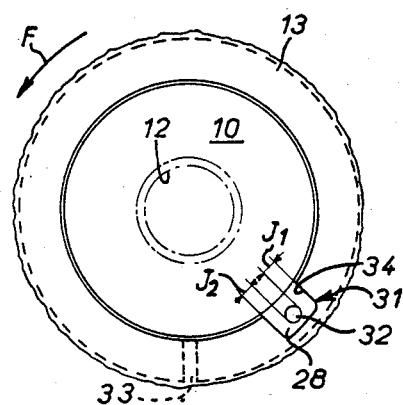

In the embodiments illustrated in FIGS. 4 and 5, the passage 34 is elongated circumfererntially, so that, for the configuration of the assembly at rest, as illustrated, a circumferential play exists between the pin 32 and the corresponding edge of this passage 34, namely $J_1$ for the circumferential direction corresponding to that identified by the arrow F in this FIG. 4, and/or $J_2$ for the opposite circumferential direction.

In the embodiment illustrated in FIG. 4, the engagement means 31 formed by these fitting members acts in a zone of the annular component with radial friction 28 which is diametrically opposite the slit 33 in the latter; in an alternative form shown in FIG. 5, they intervene in a zone circularly apart from that opposite this slit 33.

Because of the play $J_1$, and $J_2$ for the corresponding circumferential direction, the annular component with radial friction 28 effectively acts only after such a play has been absorbed.

It therefore acts, in this case, only over a particular range of the corresponding angular movement between the rotary parts A and B.

This range can, of course, be extended to a greater or lesser extent depending on the corresponding play $J_1$, $J_2$.

In this case, the action of the annular component with radial friction 28 accompanies, for example, that of the springs 26B and/or 26c which generally have a high rigidity, and not that of the springs 26A which generally have a lower rigidity.

As regards the latter, for example, only the bearing 20 and the radial collar 21 of the latter intervene.

In the foregoing, the annular component with radial friction 28 itself constitutes the elastic means associated with it.

Figure 6:
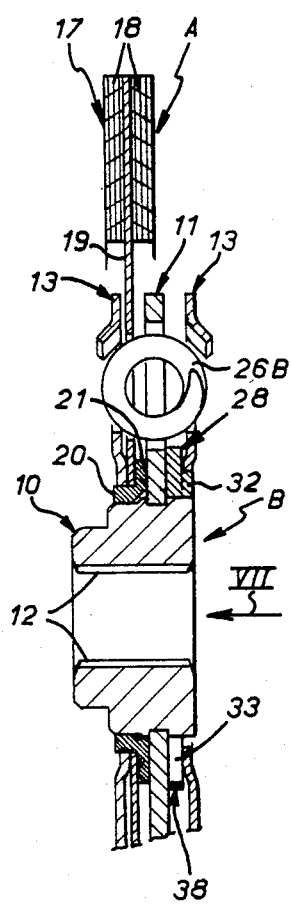
FIG. 6 repeats part of FIG. 2 and relates to another alternative embodiment.
Figure 7:
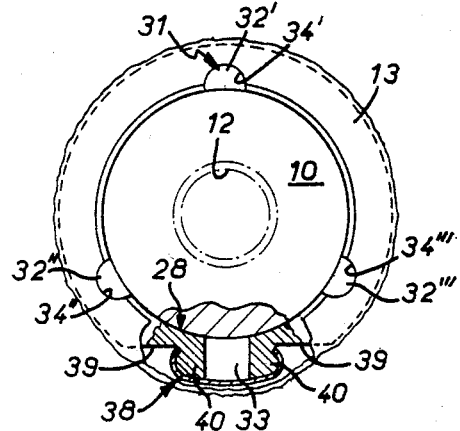
FIG. 7 is, with a local cutaway portion, a partial elevation view of this alternative embodiment, according to the arrow VII in FIG. 6.
Figure 8:
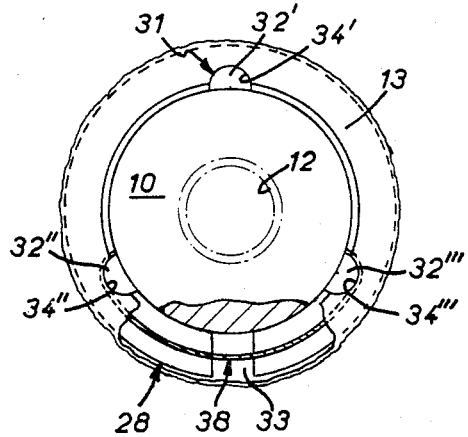
FIGS. 8 and 9 are views similar to that of FIG. 7 and each relate respectively to other alternative embodiments.

In the embodiments illustrated in FIGS. 6 to 8, the elastic means associated with the annular component with radial friction 28 comprise at least one elastic member 38 separate from the latter.

In these embodiments, this elastic member 38 acts locally, being engaged with the ends of the annular component with radial friction 28 delimiting the slit 33 in the latter.

For example, according to FIG. 7, on their outer periphery the ends each have a cut-out 39, the result of which is that they each form, in their plane, a boss 40 projecting radially outwards, and the elastic member 38 is a clip which is formed, for example, from a suitably shaped strip and which extends circumferentially from one of these bosses 40 to the other, capping both of them.

Moreover, in this embodiment, the engagement means 31 associated with the annular component with radial friction 28 are located in several zones of the latter, in practice three, which are uniformly distributed circularly round the axis of the assembly, and for each of these zones they comprise, as before, a fitting member which, fixed to the annular component with radial friction 28, is designed to interact with a complementary fitting means fixed to the rotary part A in question.

In the embodiment illustrated in FIGS. 6 and 7, for each of the relevant zones of the annular component with radial friction 28, the fitting member consists of a boss 32', 32'', 32''' which, being integral with the annular component with radial friction 28, projects axially from the latter, and, as a corollary to this, the passages 34', 34'', 34''' provided in the guide washer 13 in question consist of notches made in a complementary fashion in the inner periohery of the latter.

The boss 32' is established in a zone of the annular component with radial friction 28 which is diametrically opposite the slit 33 in the latter, and the bosses 32'' and 32''' are established symmetrically on either side of this slit 33 at 120° relative to the boss 32'.

In the alternative embodiment illustrated in FIG. 8, the elastic member 38 extends from one boss 32'', 32'''' to the other; it is, for example, a suitably shaped clip.

In the foregoing, the ends of the annular component with radial friction 28 delimiting the slit 33 in the latter are circumferentially at a distance from one another.

Figure 10:
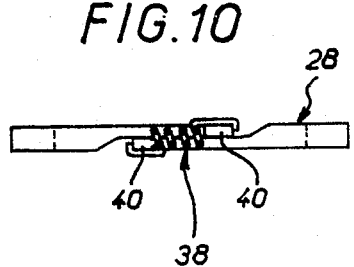
FIG. 10 is a plan view, according to the arrow X in FIG. 9, of the single annular component with radial friction which is used in the alternative embodiment illustrated in FIG. 9 and which is shown separately.
Figure 9:
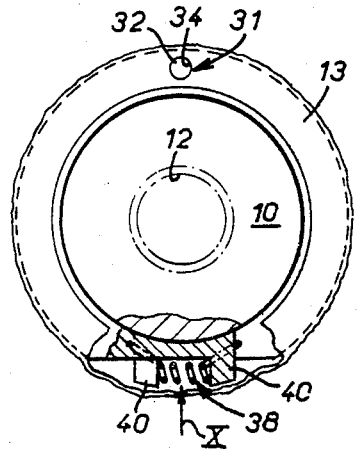

In an alternative form shown in FIGS. 9 and 10, they can overlap one another. Each of the ends forms a boss 40, and the associated elastic member 38 is a draw spring which, accommodated in the volume delimited circumferentially by the bosses 40, is coupled to both of these by means of its own ends.

In the alternative embodiments illustrated in FIGS. 11 to 14, it is the bearing 20 which constitutes an annular component with radial friction; this bearing 20 being opened circularly by at least one slit 33 and being subjected to elastic means which permanently stress it radially in the direction of an axial bearing surface 43 of the hub 10 with which it is engaged by means of its own inner axial bering surface 44.

As before, this bearing 20 could itself constitute the elastic means associated with it.

In the embodiment illustrated, however, these elastic means consist of an elastic member 38, and this in itself forms a coaxial annular component of the assembly.

As illustrated, this is a simple elastically deformable ring whch, engaged in a groove 45 provided for this purpose on the outer periphery of the bearing 20, is itself opened by a slit 46.

In practice, as regards the bearing 20, such a ring constitutes a radial compressing means, that is to say a means which tends to restrict its perimeter.

Figure 11:
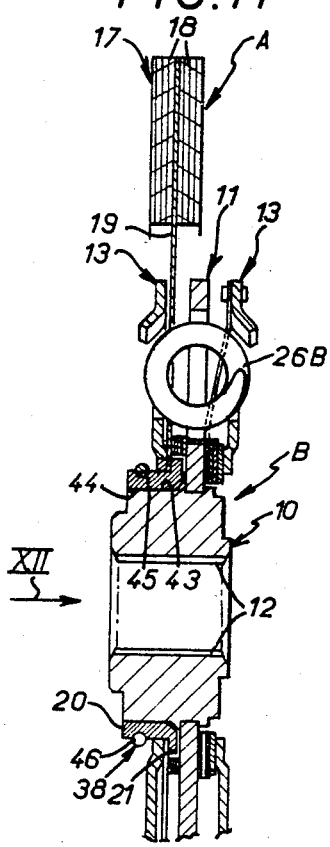
FIGS. 11 and 12 are views similar to those of FIGS. 6 and 7 respectively and relate to another alternative embodiment.
Figure 12:
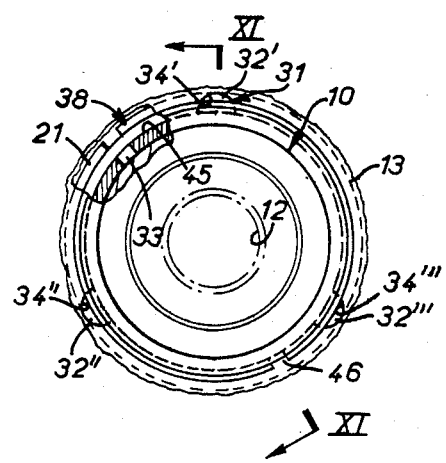

In the embodiment illustrated in FIGS. 11 and 12, the engagement means associated with the annular component with radial friction which this bearing 20 constitutes comprise, as before, three bosses 32', 32'', 32''' which, projecting axially from the associated collar 21, are engaged in passages 34', 34'', 34'41 in the corresponding guide washer 13, the passages being formed by notches provided on the inner periphery of the guide washer.

Since the bosses 32', 32'', 32''' are uniformly distributed circularly, the friction torque attributed to the annular component with radial friction which the bearing 20 constitutes is the same whether the assembly opeates under traction or whether it operates on the overrun.

Figure 13:
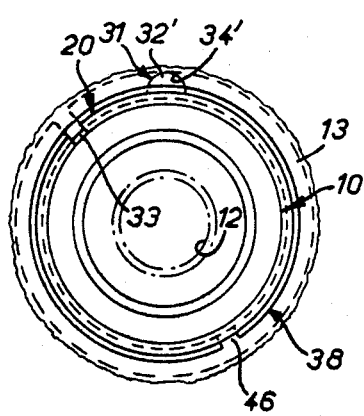
FIGS. 13 and 14 are views similar to that of FIG. 12 and relate respectively to other alternative embodiments.

In an alternative form shown in FIG. 13, only one boss 32' is provided in a zone of the bearing 20 circularly apart from the zone of this bearing 20 diametrically opposite its slit 33.

In such a case, and as before, the friction torque attributed to the annular component with radial friction which the bearing 20 constitutes is different depending on whether the assembly operates under traction or whether it operates on the overrun.

In the embodiments illustrated in FIGS. 11 to 13, the bosses 32', 32'', 32''' are engaged without play in the corresponding passages 34', 34'', 34''' of the guide washer 13 in question, so that the annular component with radial friction which the bearing 20 constitutes acts from the start of the angular movement between the rotary parts A and B and develops its effects over the entire length of this angular movement.

The friction torque attributed to it must therefore be, as before, in proportion to the spings 26A only which act at the start of the angular movement between the rotary parts A and B and which are usually springs of relatively low rigidity.

The ring forming the elastic member 38 is consequently selected so that the friction torque attributed to the annular component with radial friction which the bearing 20 constitutes is relatively low.

Other friction means, for example with an axial action, may be provided between the rotary parts A and B so as to add their effects to those of the bearing 20 constituting the annular component with radial friction when the springs 26B and 26C which have a relatively higher rigidity than the springs 26A act in turn.

Figure 14:
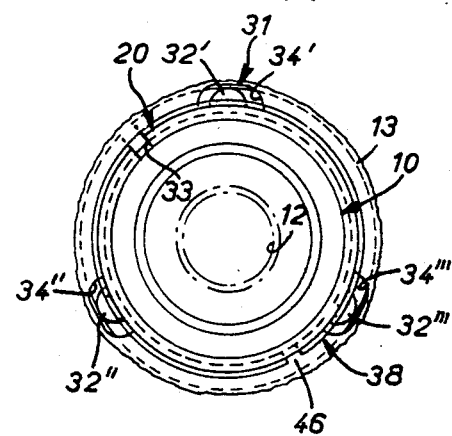

In an alternative form shown in FIG. 14, a circumferential play is provided for the configuration of the assembly at rest between the bosses 32', 32'', 32''' associated with the bearing 20 constitutes and the corresponding end edges of the passages 34', 34'', 34''' of the guide washer 13 in question.

The friction torque attributed to the bearing 20 is then associated, for example, with the springs 26B and 26C which are of relatively high rigidity, and to ensure that, as before, it is in proportion to these, the ring forming the elastic member 38 is selected accordingly.

In practice, in this embodiment, this ring must then grip the bearing 20 radially in a more vigorous manner than that used in the embodiments illustrated in FIGS. 11 to 13.

As a corollary to this, according to arrangements which, being well known per se and not forming part of the present invention, are not described in more detail here, specific friction means are associated with the springs 26A which are of relatively low rigidity.

Of course, the present invention is not limited to the embodiments described and shown, although these illustrate its wide variety of uses, but it embraces any alternative embodiment and/or combination of their various elements.

In particular, the annular component with radial friction can interact frictionally with one of the coaxial parts in question by means of an outer axial bearing surface, in which case it is engaged for this purpose in an inner axial bearing surface of the latter.

Moreover, nor is the use of the invention limited to the case where the torsion-damping device comprises only two coaxial parts mounted rotatably relative to one another, but applies just as well to the case where it comprises a greater number of coaxial parts mounted in pairs rotatably relative to one another.

I claim:

1. A torsion damping device, in particular for a clutch plate assembly, said torsion damping device comprising at least two coaxial rotary parts mounted for relative angular movement within a predetermined range, elastic means circumferentially interposed between said coaxial parts, friction means operatively disposed axially between said coaxial parts, said friction means comprising at least one annular component having an axial bearing surface, one of said rotary parts having an axial bearing surface engageable with said axial bearing surface on said annular component, engagement means for connecting said annular component for rotation with the other of said rotary parts for at least part of said predetermined range of relative angular movement in at least one direction of rotation, said annular component being a circumferentially split annular component, said split annular component being constantly biased radially against the axial bearing surface on said one rotary part.

2. A torsion damping device according to claim 1, wherein elastic biasing means radially biases said split annular component against the axial bearing surface on said one rotary part.

3. A torsion damping device according to claim 2, wherein said elastic biasing means comprises at least one elastic member separate from said split annular component.

4. A torsion damping device according to claim 3, wherein said elastic biasing means bears against end portions of said split annular component.

5. A torsion damping device according to claim 3, wherein said elastic member comprises another annular component.

6. A torsion damping device according to claim 5, wherein said elastic member defines radial biasing means.

7. A torsion damping device according to claim 2, wherein said engagement means is provided in a single zone of said split annular component circularly offset from the position diametrically opposite the open end said split annular component.

8. A torsion damping device according to claim 1, wherein said split annular component defines elastic biasing means radially biasing said split annular component against the axial bearing surface on said one rotary part, the diameter of said split annular component in its rest configuration being less than that of the axial bearing surface on said one rotary part.

9. A torsion damping device according to claim 1, wherein free ends of said split annular component are circumferentially spaced from each other defining a slot therebetween.

10. A torsion damping device according to claim 1, wherein free end portions of said split annular component overlap each other.

11. A torsion damping device according to claim 1, wherein said engagement means is provided in a single zone of said split annular component diametrically opposite the open end thereof.

12. A torsion damping device according to claim 1, wherein said engagement means is provided in a plurality of uniformly angularly spaced zones around said split annular component.

13. A torsion damping device according to claim 1, wherein said engagement means comprises a first coupling member fixed to said split annular component, a second complementary coupling member fixed to said one part for engagement with said first coupling member, circumferential clearance being provided between said first and second coupling members in at least said one direction of rotation of relative angular movement.

14. A torsion damping device according to claim 1, wherein said engagement means comprises a first coupling member fixed to said split annular component, and a second complementary coupling member fixed to said one rotary part, said first and second coupling members being in playfree engagement with each other.

* * * * *